United States Patent
Kimoto

(10) Patent No.: US 11,917,342 B2
(45) Date of Patent: Feb. 27, 2024

(54) PROJECTION SYSTEM AND CONTROL METHOD THEREFOR

(71) Applicant: SONY SEMICONDUCTOR SOLUTIONS CORPORATION, Kanagawa (JP)

(72) Inventor: Taiyou Kimoto, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/756,133

(22) PCT Filed: Nov. 13, 2020

(86) PCT No.: PCT/JP2020/042384
§ 371 (c)(1),
(2) Date: May 18, 2022

(87) PCT Pub. No.: WO2021/106617
PCT Pub. Date: Jun. 3, 2021

(65) Prior Publication Data
US 2022/0417482 A1    Dec. 29, 2022

(30) Foreign Application Priority Data
Nov. 28, 2019    (JP) .................. 2019-215376

(51) Int. Cl.
*H04N 9/31*    (2006.01)
*G03B 21/14*    (2006.01)

(52) U.S. Cl.
CPC ......... *H04N 9/3194* (2013.01); *G03B 21/142* (2013.01); *H04N 9/312* (2013.01); *H04N 9/3155* (2013.01)

(58) Field of Classification Search
CPC ...... G03B 21/14; G03B 21/28; G03B 21/142; G03B 21/145; G03B 21/147; H04N 9/312;
(Continued)

(56) References Cited

U.S. PATENT DOCUMENTS 8,690,335 B2 * 4/2014 Okumura ............. H04N 9/3176
353/30
9,215,432 B1 * 12/2015 Rohr .................... H04N 9/3182
(Continued)

FOREIGN PATENT DOCUMENTS

CN    102164190 A    8/2011
JP    2004-226631 A    8/2004
(Continued)

OTHER PUBLICATIONS

International Search Report and Written Opinion of PCT Application No. PCT/JP2020/042384, dated Jan. 19, 2021, 09 pages of ISRWO.

Primary Examiner — Sultan Chowdhury
(74) Attorney, Agent, or Firm — CHIP LAW GROUP

(57) ABSTRACT

A projection system according to an embodiment of the present technology includes an image formation apparatus, a projection lens, a measurement apparatus, a control apparatus, and a measurement assisting apparatus. The image formation apparatus forms image light. The projection lens projects the image light. The measurement apparatus measures the image light. The control apparatus controls the image formation apparatus on the basis of output of the measurement apparatus. The measurement assisting apparatus is disposed between the image formation apparatus and the projection lens and is configured to be capable of selectively switching between a first state to cause the image (Continued)

light to enter the projection lens and a second state to cause the image light to enter the measurement apparatus.

13 Claims, 12 Drawing Sheets

(58) Field of Classification Search
CPC ...... H04N 9/315; H04N 9/317; H04N 9/3141; H04N 9/3155; H04N 9/3176; H04N 9/3182; H04N 9/3185; H04N 9/3194
See application file for complete search history.

(56) References Cited

U.S. PATENT DOCUMENTS

| | | | | |
|---|---|---|---|---|
| 2007/0052928 A1* | 3/2007 | Maeda | ............... | G03B 21/2073 353/20 |
| 2009/0009723 A1 | 1/2009 | Keller et al. | | |
| 2009/0040397 A1* | 2/2009 | Chan | ............... | H04N 23/00 348/751 |
| 2011/0242392 A1 | 10/2011 | Chiang | | |
| 2012/0182416 A1* | 7/2012 | Kawaguchi | ............... | H04N 9/3185 353/69 |
| 2012/0256879 A1* | 10/2012 | Liu | ............... | G06F 3/0425 353/34 |
| 2013/0321781 A1* | 12/2013 | Aruga | ............... | G03B 21/142 353/121 |
| 2018/0262728 A1* | 9/2018 | Kobayashi | ............... | H04N 9/3105 |

FOREIGN PATENT DOCUMENTS

| | | |
|---|---|---|
| JP | 2005-165224 A | 6/2005 |
| JP | 2010-014924 A | 1/2010 |
| JP | 2010-113009 A | 5/2010 |
| JP | 2011-158845 A | 8/2011 |
| JP | 2014-154673 A | 8/2014 |
| JP | 2015-018051 A | 1/2015 |
| JP | 2017-204799 A | 11/2017 |
| TW | 201130282 A | 9/2011 |
| WO | 2006/020187 A2 | 2/2006 |

* cited by examiner

PROJECTION SYSTEM AND CONTROL METHOD THEREFOR

CROSS REFERENCE TO RELATED APPLICATIONS

This application is a U.S. National Phase of International Patent Application No. PCT/JP2020/042384 filed on Nov. 13, 2020, which claims priority benefit of Japanese Patent Application No. JP 2019-215376 filed in the Japan Patent Office on Nov. 28, 2019. Each of the above-referenced applications is hereby incorporated herein by reference in its entirety.

TECHNICAL FIELD

The present technology relates to a projection system and a control method therefor.

BACKGROUND ART

An image projection apparatus such as a projector modulates light from a light source through a light modulator to thereby form image light and displays an image on a screen or the like via a projection lens. Regarding this type of projector, there is known a technology that detects projected image light and adjusts a position deviation of the light modulator or brightness and the like of the image.

For example, Patent Literature 1 has disclosed a projector including a polarization splitting means that splits unnecessary polarized components of polarized components of combined image light emitted from a combining optical system, which are unnecessary for projection, an image sensor that outputs image data corresponding to the split unnecessary polarized components, and an alignment control apparatus that adjusts positions of a plurality of light modulators corresponding to different color components on the basis of the image data output from the image sensor.

Moreover, Patent Literature 2, 3 has disclosed an image display apparatus that guides part of light combined by a color combining optical system to a light quantity sensor and keeps brightness of a projected image constant on the basis of a measurement value of the light quantity sensor.

CITATION LIST

Patent Literature

Patent Literature 1: Japanese Patent Application Laid-open No. 2010-14924
Patent Literature 2: Japanese Patent Application Laid-open No. 2017-204799
Patent Literature 3: Japanese Patent Application Laid-open No. 2015-18051

DISCLOSURE OF INVENTION

Technical Problem

As described above, the conventional projector is configured to dispose the polarization splitting means on the optical axis of emission of the image light and receives part of the image light through the image sensor or the light quantity sensor in order to measure the position deviation of the light modulator and the brightness of the image light. Therefore, since image light projected onto the screen always passes through the polarization splitting means, the luminance lowers. Similarly, the brightness of an image received by the image sensor or the light quantity sensor via the polarization splitting means is also insufficient, and there is a problem in that a projected image cannot be correctly measured.

In view of the above-mentioned circumstances, it is an objective of the present technology to provide a projection system capable of correctly measuring a projected image while preventing the luminance of the projected image from lowering and a control method therefor.

Solution to Problem

A projection system according to an embodiment of the present technology includes an image formation apparatus, a projection lens, a measurement apparatus, a control apparatus, and a measurement assisting apparatus.

The image formation apparatus forms image light.

The projection lens projects the image light.

The measurement apparatus measures the image light.

The control apparatus controls the image formation apparatus on the basis of output of the measurement apparatus.

The measurement assisting apparatus is disposed between the image formation apparatus and the projection lens and is configured to be capable of selectively switching between a first state to cause the image light to enter the projection lens and a second state to cause the image light to enter the measurement apparatus.

The measurement assisting apparatus may have a light-reflecting element that reflects, in the second state, the image light toward the measurement apparatus.

The light-reflecting element may be a light-controlling element capable of switching between a light-transmitting mode and a light-shielding mode.

The light-reflecting element may be configured to be capable of movement or rotation between a first position that is a position spaced apart from an optical axis of the image formation apparatus and a second position that is a position on the optical axis.

The light-reflecting element may be configured to be capable of switching between a first attitude to reflect the image light toward the projection lens and a second attitude to reflect the image light toward the measurement apparatus.

The measurement apparatus may include an imaging element.

The imaging element may be disposed in the image formation apparatus.

The projection system may further include an imaging apparatus that captures a image projected by the projection lens. In this case, the control apparatus may control the image formation apparatus on the basis of the output of the measurement apparatus and output of the imaging apparatus.

The control apparatus may have an evaluation unit that evaluates the image light on the basis of the output of the measurement apparatus.

The image formation apparatus may include a three-panel image display element.

The image formation apparatus may include a single-panel image display element.

The image display element may be a spontaneous light-emitting-type display element.

A control method for a projection system according to an embodiment of the present technology includes forming image light through an image formation apparatus.

The image light enters a projection lens when projecting the image light.

The light-reflecting element is disposed between the image formation apparatus and the projection lens and the image light reflected on the light-reflecting element enters a measurement apparatus when evaluating the image light.

MODE(S) FOR CARRYING OUT THE INVENTION

Hereinafter, embodiments according to the present technology will be described with reference to the drawings.

First Embodiment

Figure 1:
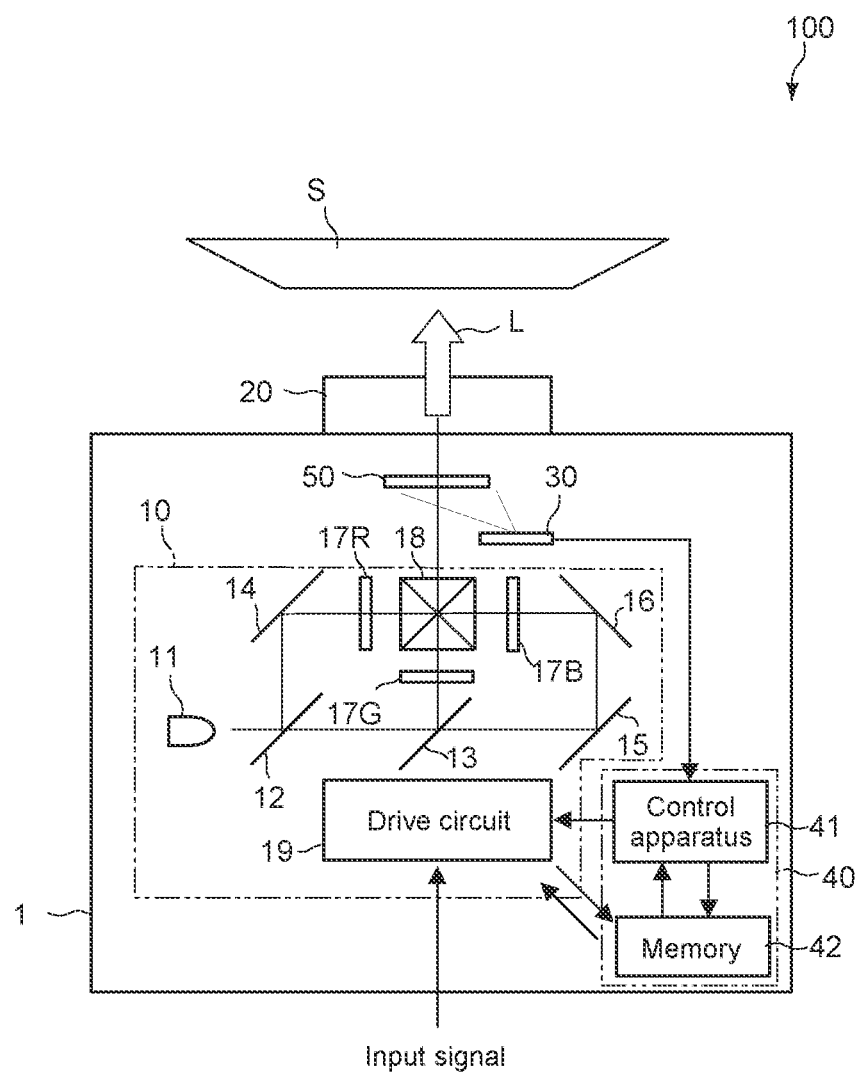
FIG. 1 A schematic configuration diagram of a projection system according to a first embodiment of the present technology.

FIG. 1 is a schematic configuration diagram of a projection system 100 according to a first embodiment of the present technology. The projection system 100 according to this embodiment is configured as an image projecting apparatus that projects an image onto a projection surface such as a screen S.

The projection system 100 includes an image formation apparatus 10, a projection lens 20, a measurement apparatus 30, a controller 40, and a measurement assisting apparatus 50.

The image formation apparatus 10 forms an image light L projected onto the screen S. In this embodiment, the image formation apparatus 10 includes a light source 11, a first dichroic mirror 12, a second dichroic mirror 13, a first reflection mirror 14, a second reflection mirror 15, a third reflection mirror 16, liquid-crystal panels 17R, 17G, and 17B serving as a three-panel image display element, a combining prism 18, and a driving circuit 19.

The light source 11 is, for example, a super-high pressure mercury lamp and emits white light. The light source 11 may include, although not shown in the figure, optical elements such as a UV cut filter, a fly eye lens, and a condenser lens.

The first dichroic mirror 12 reflects red light, for example, of white light emitted from the light source 11, and allows blue light and green light to pass therethrough. The red light reflected on the first dichroic mirror 12 is reflected on the first reflection mirror 14 and enters a liquid-crystal panel 17R.

The second dichroic mirror 13 allows the blue light, for example, of the blue light and green light passing through the first dichroic mirror 12, to pass therethrough and reflects the green light. The green light reflected on the second dichroic mirror 13 enters a liquid-crystal panel 17G. The blue light passing through the second dichroic mirror 13 is reflected on the second reflection mirror 15 and the third reflection mirror 16 and enters a liquid-crystal panel 17B.

The combining prism 18 combines the red light emitted from the liquid-crystal panel 17R, the green light emitted from the liquid-crystal panel 17G, and the blue light emitted from the liquid-crystal panel 17B on an identical optical path. The image light L that is combined light at the combining prism 18 is magnified and projected on the screen S through the projection lens 20.

The driving circuit 19 controls the output of the light source 11. Moreover, on the basis of the input signal including the image information, the driving circuit 19 applies signal voltages of the red light, the green light, and the blue light on the liquid-crystal panels 17R, 17G, and 17B, respectively, and drives each pixel of the respective liquid-crystal panels 17R, 17G, and 17B. The red image, the green image, and the blue image formed by the respective liquid-crystal panels 17R, 17G, and 17B are combined through the combining prism 18 and projected on the screen S as described above.

It should be noted that in the image formation apparatus 10, various optical elements such as a polarization film and a half-wave plate may be disposed at appropriate positions in addition to the above-mentioned components. Moreover, a laser light source may be used as the light source 11. In this case, a micro electro mechanical system (MEMS) device that performs spatial modulation on laser light beams split into the respective colors may be used instead of the liquid-crystal panels 17R, 17G, and 17B.

The projection lens 20 is installed in a casing 1 that houses the image formation apparatus 10, the measurement apparatus 30, the controller 40, and the measurement assisting apparatus 50. The projection lens 20 is disposed on the optical axis of the combining prism 18 and projects onto the screen S the image light L emitted from the combining prism 18. The projection lens 20 is typically constituted by a lens unit capable of adjusting the focal position and the like of the image light L in accordance with a user operation.

The measurement apparatus 30 is a sensor head for measuring the image light formed by the image formation apparatus 10. In this embodiment, the measurement apparatus 30 includes a solid-state imaging element such as a complementary metal oxide semiconductor (CMOS) and a charge coupled device (CCD). The measurement apparatus 30 receives image light via the measurement assisting apparatus 50 to be described later and outputs a detection signal (image signal) thereof to the controller 40.

The controller 40 includes a control apparatus 41 and a memory 42. The control apparatus 41 is constituted by a computer including an arithmetic operation element such as a CPU. The control apparatus 41 controls driving of the image formation apparatus 10 on the basis of the output of the measurement apparatus 30.

The control apparatus 41 includes, as functional blocks, an image processing unit that processes the detection signal output from the measurement apparatus 30 and an evaluation unit that evaluates the image light on the basis of the processed image. The details of the evaluation of the image light is not particularly limited. Typically, the details of the evaluation of the image light can include the luminance (brightness) of the image light, the presence/absence of image defects due to degradation, registration deviation, and the like of the liquid-crystal panels 17R, 17G, and 17B, the presence/absence of degradation of each of the optical elements that constitute the image formation apparatus 10, and the like. The control apparatus 41 compares the output of the measurement apparatus 30 with various types of reference data read from the memory 42 and controls the driving circuit 19 so that desired image light can be obtained, to thereby perform calibration processing of the image light.

The memory 42 is a storage device such as a semiconductor storage element and a hard disk and stores various types of reference data including the evaluation result of the image light by the control apparatus 41, projected image data based on the input signal, control parameters of the respective liquid-crystal panels 17R, 17G, and 17B by the driving circuit 19, and the like.

The measurement assisting apparatus 50 is disposed inside the casing 1 and configured to be capable of selectively switching between a first state to cause the image light to enter the projection lens 20 and a second state to cause the image light to enter the measurement apparatus 30. Typically, the measurement assisting apparatus 50 is switched to the first state when projecting the image onto the screen S and is switched to the second state when performing the calibration processing of the image light. The switching between the first and second states of the measurement assisting apparatus 50 is performed at the controller 40.

In this embodiment, the measurement assisting apparatus 50 is constituted by a light-controlling element disposed between the image formation apparatus 10 and the projection lens 20. Examples of such a light-controlling element can include a liquid-crystal shutter having a light-transmitting mode and a light-shielding mode and a light-controlling element such as a high-contrast light control film. The light-transmitting mode corresponds to the first state and the light-shielding mode corresponds to the second state.

The measurement assisting apparatus 50 is disposed on the optical axis of the image light L emitted from the combining prism 18. On the light-transmitting mode, the measurement assisting apparatus 50 functions as a transparent screen. The transmittance of the image light L on the light-transmitting mode is favorably as high as possible, and typically 90% or more. On the other hand, on the light-shielding mode, the measurement assisting apparatus 50 functions as a light-reflecting element that reflects the image light L toward the measurement apparatus 30.

When the projection system 100 according to this embodiment configured in the above-mentioned manner projects the image onto the screen S, the measurement assisting apparatus 50 is switched to the first state (light-transmitting mode). Accordingly, the image light L emitted from the combining prism 18 causes the measurement assisting apparatus 50 in a transparent state to pass therethrough, enters the projection lens 20, and is projected onto the screen S.

On the other hand, when performing the calibration processing of the image light (measurement of the image light L), the measurement assisting apparatus 50 is switched to the second state (light-shielding mode). Accordingly, the image light L emitted from the combining prism 18 does not reach the projection lens 20, is reflected on the measurement assisting apparatus 50, and enters the measurement apparatus 30. The measurement apparatus 30 generates an image signal corresponding to the entering image light L and outputs the image signal to the controller 40 as a detection signal. The control apparatus 41 performs image processing with respect to the output of the measurement apparatus 30 and evaluates whether or not it is an image having desired image quality. At this time, the control apparatus 41 may control the driving circuit 19 so that the image formation apparatus 10 forms image light in a pattern for calibration.

For example, in a case where the image light L does not reach a desired luminance, the driving circuit 19 is controlled to increase the output of the light source 11. Moreover, in a case where it is evaluated that a deviation of an arbitrary color image has been generated on the basis of the image signal acquired by the measurement apparatus 30, an image display position of the corresponding liquid-crystal panel is adjusted through the driving circuit 19. The timing to perform the calibration processing is not particularly limited. The calibration processing may be performed on a standby mode of the projection system 100, may be performed just before the image projecting, or may be performed during a predetermined period after the image projecting ends.

As described above, in accordance with this embodiment, since the measurement assisting apparatus 50 is constituted by the light-controlling element capable of selectively switching between two states of the light-transmitting mode and light-shielding (reflecting) mode, as compared to a method of splitting image light through a polarization splitting means as in the conventional art, it is possible to cause the image light L formed at the image formation apparatus 10 to enter the projection lens 20 or the measurement apparatus 30 without lowering its luminance or brightness. Accordingly, it is possible to project a high-luminance image onto the screen S and acquire a high-luminance captured image at the measurement apparatus 30, and therefore accurate image measurement becomes possible.

Moreover, since the measurement apparatus 30 is configured to capture image light inside the casing 1, data without external factors such as influences of a projected surface of the screen S and the like, lens characteristics of the projection lens 20, and peripheral light outside the casing 1 can be acquired. Accordingly, calibration of the image light can be performed with high accuracy. Moreover, calibration processing can be performed without the need for showing an image for calibration to a user.

In addition, since the position of the measurement assisting apparatus 50 is fixed, simplification of the configuration can be achieved and the occurrence of measurement defects due to a position deviation of the measurement assisting apparatus 50 can be prevented.

Second Embodiment

Figure 2:
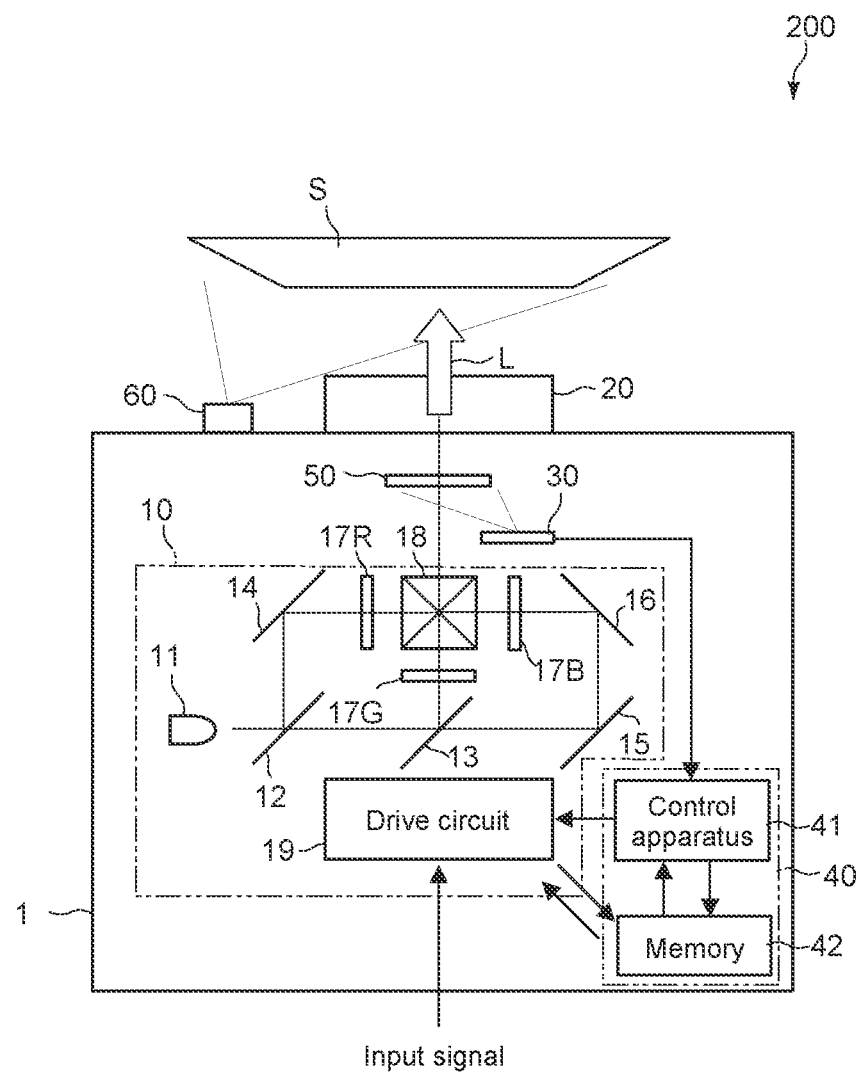
FIG. 2 A schematic configuration diagram of a projection system according to a second embodiment of the present technology.

FIG. 2 is a schematic configuration diagram of a projection system 200 according to a second embodiment of the present technology. Hereinafter, configurations different from that of the first embodiment will be mainly described, configurations similar to those of the first embodiment will be denoted by similar reference signs, and the descriptions thereof will be omitted or simplified.

The projection system 200 according to this embodiment is different from the first embodiment in that the projection system 200 further includes an imaging apparatus 60 that captures an image projected by the projection lens 20. The imaging apparatus 60 is constituted by a solid-state imaging element such as a CMOS and a CCD and is configured to be capable of capturing an image projected on the screen S.

The imaging apparatus 60 is disposed outside the casing 1 and is typically installed on an outer surface of the casing 1. The installation place to the casing 1 is not particularly limited, and the imaging apparatus 60 is typically disposed in the front of the casing 1 in which the projection lens 20 is installed. It should be noted that the imaging apparatus 60 is not limited to the example in which the imaging apparatus 60 is installed in the casing 1, and the imaging apparatus 60 may be installed at a position different from that of the casing 1.

The image data captured by the imaging apparatus 60 is input to the controller 40. The control apparatus 41 of the controller 40 controls the image formation apparatus 10 on the basis of the output of the measurement apparatus 30 and the output of the imaging apparatus 60.

For example, the control apparatus 41 acquires image data to be projected (via the driving circuit 19) in accordance with an input signal. Moreover, the control apparatus 41 acquires, from the measurement apparatus 30, image light L on an optical axis, which does not have a distortion of the projected image because the lens characteristics of the projection lens 20 are not added. In addition, the control apparatus 41 acquires, from the imaging apparatus 60, captured data of a projected image that the user sees, i.e., an image having a distortion of a trapezoid or the like that depends on an installation environment such as the attitude of the casing 1 because the lens characteristics of the projection lens 20 are added.

Also in this embodiment, actions and effects similar to those of the above-mentioned first embodiment can be obtained. In particular, in accordance with this embodiment, actions and effects as follows can be obtained by utilizing the various types of data described above.

For example, on the basis of the input signal and the output signal of the measurement apparatus 30, image defects due to degradation or registration deviation of the liquid-crystal panels 17R, 17G, and 17B can be corrected with high accuracy. Moreover, projected images before and after the lens characteristics of the projection lens 20 are added are acquired on the basis of the output of the measurement apparatus 30 and the output of the imaging apparatus 60, and the distortion correction of the projection lens 20 can be performed with high accuracy. In addition, it is possible to detect the shape of the projected image and suitably perform trapezoidal correction or the like on the basis of the input signal and the output of the imaging apparatus 60.

It should be noted that the installation example of the imaging apparatus 60 described above and the operation example of the control apparatus 41 associated with it can also be applied to respective embodiments to be described later.

Third Embodiment

Figure 3:
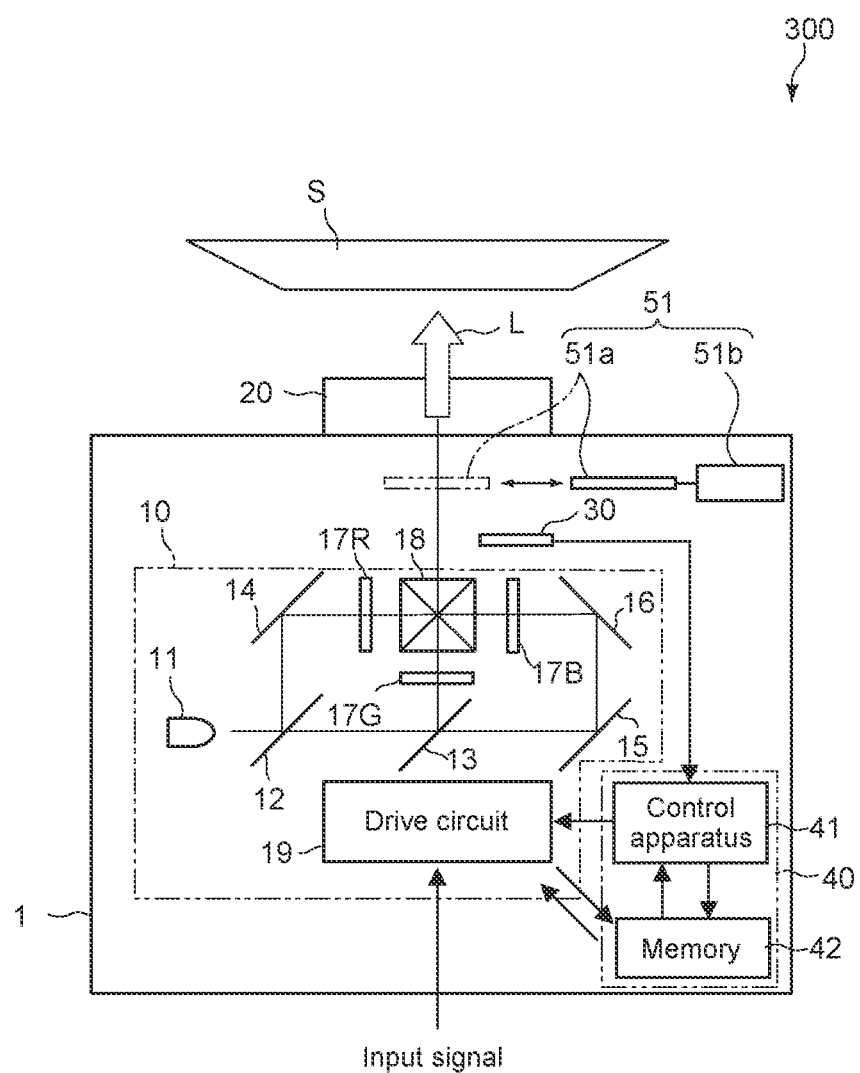
FIG. 3 A schematic configuration diagram of a projection system according to a third embodiment of the present technology.

FIG. 3 is a schematic configuration diagram of a projection system 300 according to a third embodiment of the present technology. Hereinafter, configurations different from that of the first embodiment will be mainly described, configurations similar to those of the first embodiment will be denoted by similar reference signs, and the descriptions thereof will be omitted or simplified.

The projection system 300 according to this embodiment is different from the first embodiment in the configuration of the measurement assisting apparatus. In this embodiment, a measurement assisting apparatus 51 includes a light-reflecting element 51a such as a reflection mirror and a drive cylinder 51b that movably supports the light-reflecting element 51a inside the casing 1. The operation of the drive cylinder 51b is controlled by the controller 40.

In this embodiment, the light-reflecting element 51a is configured to be linearly movable between a first position (position indicated by the solid line in FIG. 3) that is a position spaced apart from the optical axis of the image formation apparatus 10 (combining prism 18) that is the optical axis of emission of the image light L and a second position that is the position on the optical axis (position indicated by the long dashed double-short dashed line in FIG. 3). The second position is set to a position at which the image light L from the image formation apparatus 10 is reflected toward the measurement apparatus 30 by the light-reflecting element 51a.

In the projection system 300 according to this embodiment configured in the above-mentioned manner, when the light-reflecting element 51a is at the first position, the measurement assisting apparatus 51 enters a first state to cause the image light L from the image formation apparatus 10 to enter the projection lens 20. On the other hand, when the light-reflecting element 51a is at the second position, the measurement assisting apparatus 51 enters a second state to reflect the image light L from the image formation apparatus 10 and cause the image light L to enter the measurement apparatus 30. Accordingly, actions and effects similar to those of the first embodiment can be obtained.

Fourth Embodiment

Figure 4:
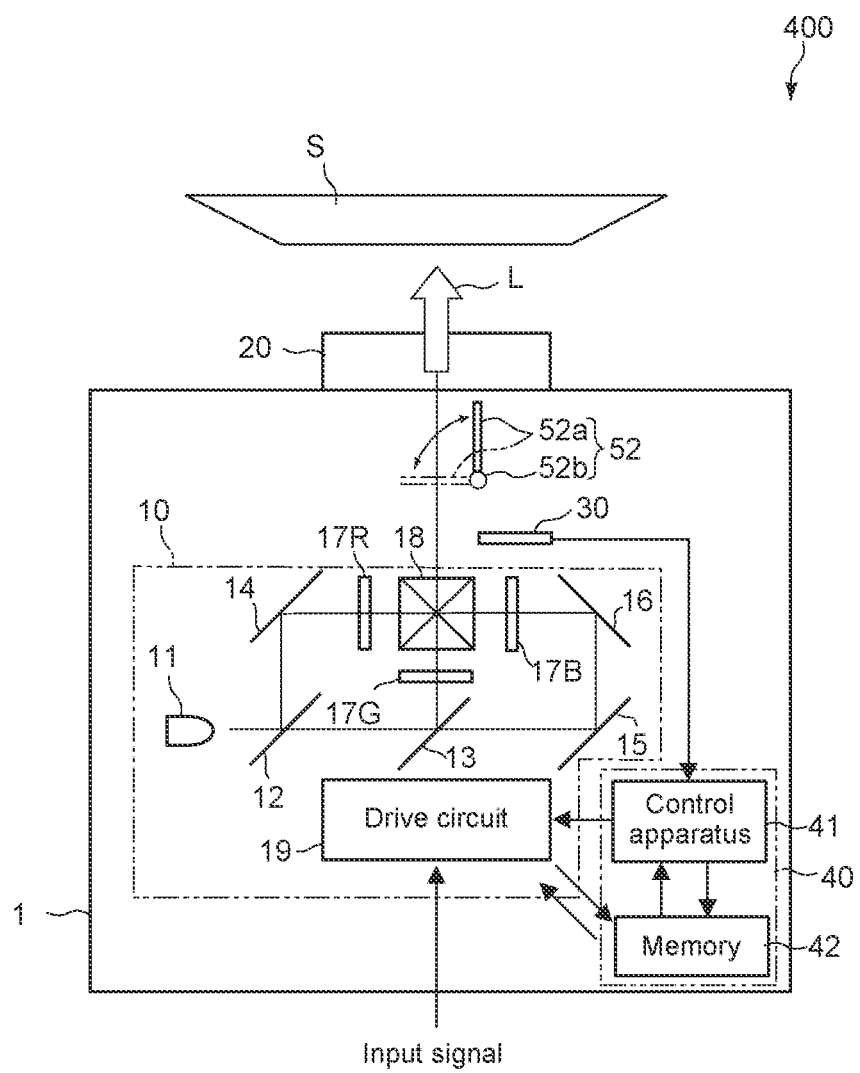
FIG. 4 A schematic configuration diagram of a projection system according to a fourth embodiment of the present technology.

FIG. 4 is a schematic configuration diagram of a projection system 400 according to a fourth embodiment of the present technology. Hereinafter, configurations different from that of the first embodiment will be mainly described, configurations similar to those of the first embodiment will be denoted by similar reference signs, and the descriptions thereof will be omitted or simplified.

The projection system 400 according to this embodiment is different from the first embodiment in the configuration of the measurement assisting apparatus. In this embodiment, a measurement assisting apparatus 52 includes a light-reflecting element 52a such as a reflection mirror and a rotation axis 52b that rotatably supports the light-reflecting element 52a inside the casing 1. The operation of the rotation axis 52b is controlled by the controller 40.

In this embodiment, the light-reflecting element 52a is configured to be capable of rotation around the rotation axis 52b between a first position (position indicated by the solid line in FIG. 4) that is a position spaced apart from the optical axis of the image formation apparatus 10 (combining prism 18) that is the optical axis of emission of the image light L and a second position that is the position on the optical axis (position indicated by the long dashed double-short dashed line in FIG. 4). The second position is set to a position at which the image light L from the image formation apparatus 10 is reflected toward the measurement apparatus 30 by the light-reflecting element 52a.

In the projection system 400 according to this embodiment configured in the above-mentioned manner, when the light-reflecting element 52a is at the first position, the measurement assisting apparatus 52 enters a first state to cause the image light L from the image formation apparatus 10 to enter the projection lens 20. On the other hand, when the light-reflecting element 52a is at the second position, the measurement assisting apparatus 52 enters a second state to reflect the image light L from the image formation apparatus 10 and cause the image light L to enter the measurement apparatus 30. Accordingly, actions and effects similar to those of the first embodiment can be obtained.

Fifth Embodiment

Figure 5:
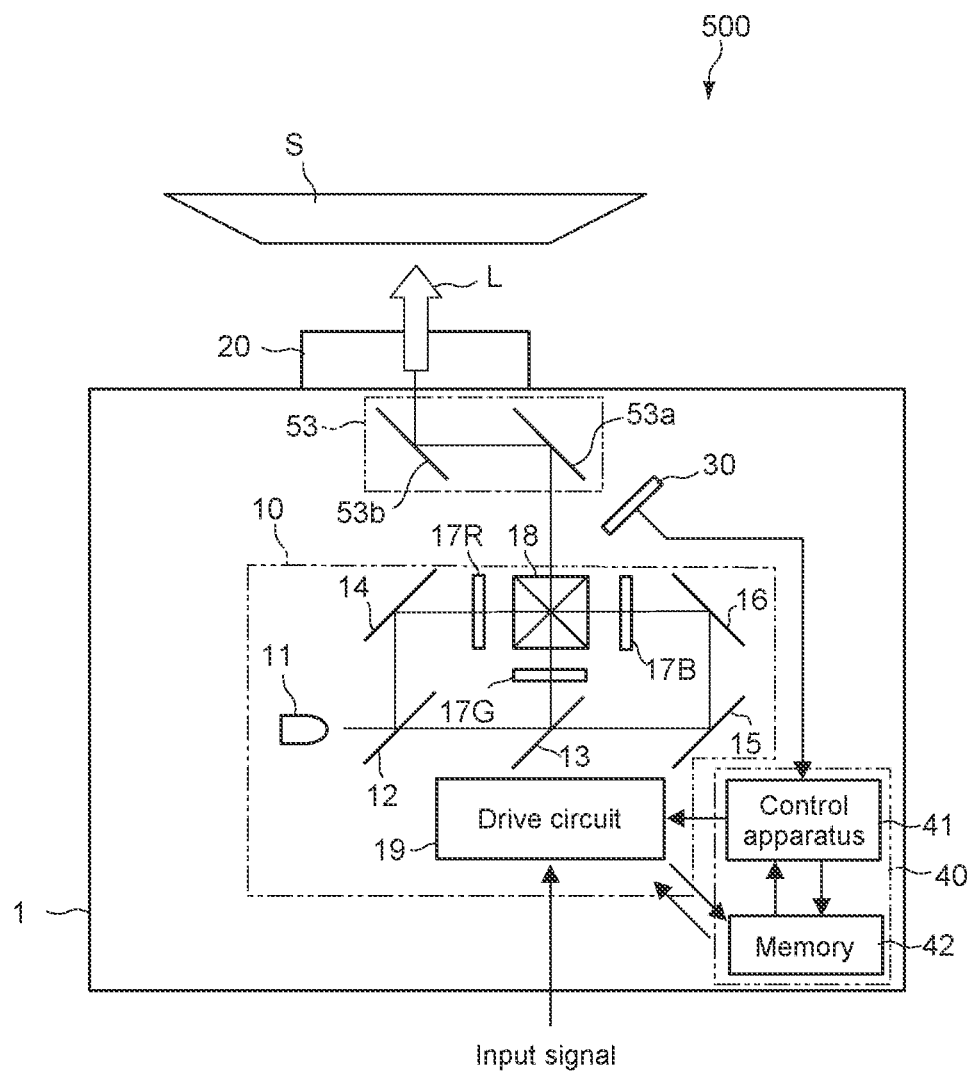
FIG. 5 A schematic configuration diagram of a projection system according to a fifth embodiment of the present technology.
Figure 6:
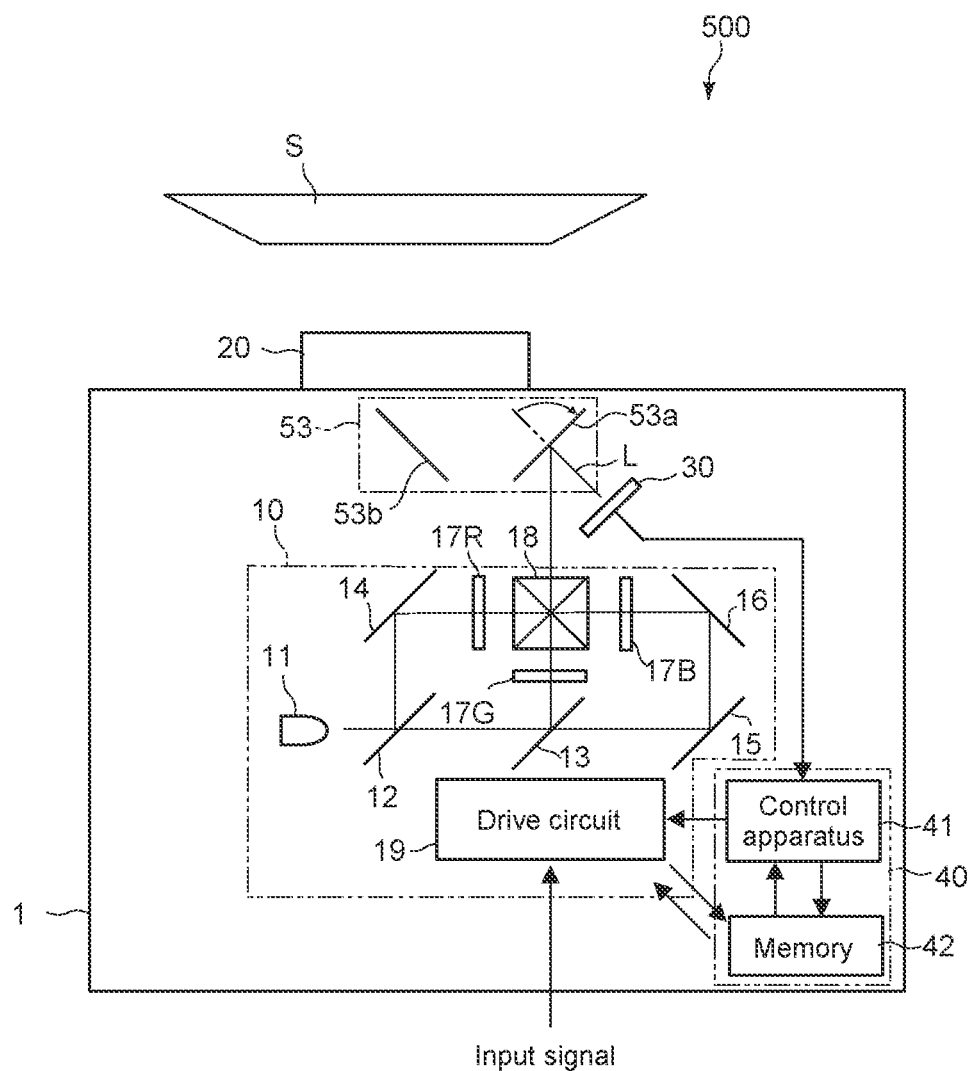
FIG. 6 A schematic configuration diagram describing one action of a projection system of FIG. 5.

FIGS. 5 and 6 are schematic configuration diagrams of a projection system 500 according to a fifth embodiment of the present technology. Hereinafter, configurations different from that of the first embodiment will be mainly described, configurations similar to those of the first embodiment will be denoted by similar reference signs, and the descriptions thereof will be omitted or simplified.

The projection system 500 according to this embodiments different from the first embodiment in the configuration of the measurement assisting apparatus. In this embodiment, a measurement assisting apparatus 53 includes a first light-reflecting element 53a such as a reflection mirror and a second light-reflecting element 52b also such as a reflection mirror. The first light-reflecting element 53a and the second light-reflecting element 53b are respectively disposed at predetermined positions inside the casing 1 and the first light-reflecting element 53a is configured to be capable of rotation around a rotation axis (not shown).

The first light-reflecting element 53a is configured to selectively enter a first attitude shown in FIG. 5 and a second attitude shown as the solid line in FIG. 6. In the first attitude, the first light-reflecting element 53a reflects the image light L from the image formation apparatus 10 toward the second light-reflecting element 53b. The second light-reflecting element 53b reflects light reflected from the first light-reflecting element 53a in the first attitude toward the projection lens 20. On the other hand, in the second attitude, the first light-reflecting element 53a reflects the image light L from the image formation apparatus 10 toward the measurement apparatus 30. The attitude of the first light-reflecting element 53a is controlled by the controller 40.

In the projection system 500 according to this embodiment configured in the above-mentioned manner, when the first light-reflecting element 53a is in the first attitude, the measurement assisting apparatus 53 enters a first state to cause the image light L from the image formation apparatus 10 to enter the projection lens 20. On the other hand, when the first light-reflecting element 53a is in the second attitude, the measurement assisting apparatus 53 enters a second state to reflect the image light L from the image formation apparatus 10 and cause the image light L to enter the measurement apparatus 30. Accordingly, actions and effects similar to those of the first embodiment can be obtained.

Sixth Embodiment

Figure 7:
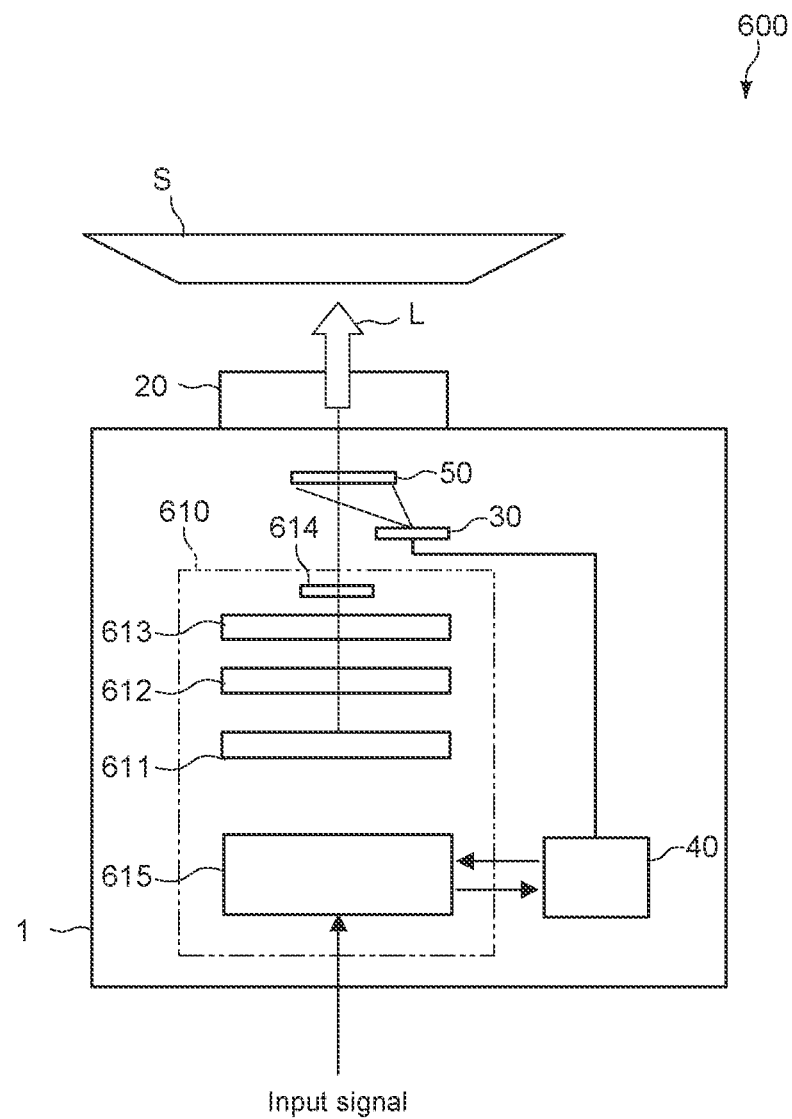
FIG. 7 A schematic configuration diagram of a projection system according to a sixth embodiment of the present technology.

FIG. 7 is a schematic configuration diagram of a projection system 600 according to a sixth embodiment of the present technology. Hereinafter, configurations different from that of the first embodiment will be mainly described, configurations similar to those of the first embodiment will be denoted by similar reference signs, and the descriptions thereof will be omitted or simplified.

The projection system 600 according to this embodiment is different from the first embodiment in the configuration of the image formation apparatus. In this embodiment, an image formation apparatus 610 includes a blue light source 611, a phosphor 612, a color wheel 613, a liquid-crystal panel 614 serving as a single-panel image display element, and a driving circuit 615.

The blue light source 611 emits blue light to the phosphor 612. The phosphor 612 is excited by being irradiated with blue light, and emits white light toward the color wheel 613. The color wheel 613 typically includes a rotor in which red, green, and blue color filters are arranged sequentially in the circumferential direction, and emits red light, green light, and blue light to the liquid-crystal panel 614 in a time division manner by being rotated at a predetermined number of rotations. The liquid-crystal panel 614 forms an image corresponding to an input signal on the basis of a control command from the driving circuit 615 and emits image light L toward the projection lens 20.

The measurement assisting apparatus 50 is disposed on the optical axis of the image light L between the liquid-crystal panel 614 and the projection lens 20. As in the first embodiment, the measurement assisting apparatus 50 is a light-controlling element capable of selectively switching between a light-transmitting mode (first state) to cause the image light L to enter the projection lens 20 and a light-shielding mode (second state) to reflect the image light L toward the measurement apparatus 30.

It should be noted that the present technology is not limited thereto, and the measurement assisting apparatuses 51 to 53 (see FIG. 3 to FIG. 6) described in the third to fifth embodiments may be used as the measurement assisting apparatus.

Also in the projection system 600 according to this embodiment configured in the above-mentioned manner, actions and effects similar to those of the first embodiment can be obtained. In accordance with this embodiment, since the liquid-crystal panel 614 that constitutes the image formation apparatus 110 is single (single-panel), the image formation apparatus can be downsized as compared to the case of the three-panel type as in the first embodiment. It should be noted that a MEMS device such as a digital mirror device (DMD) may be used in place of the liquid-crystal panel 614.

Seventh Embodiment

Figure 8:
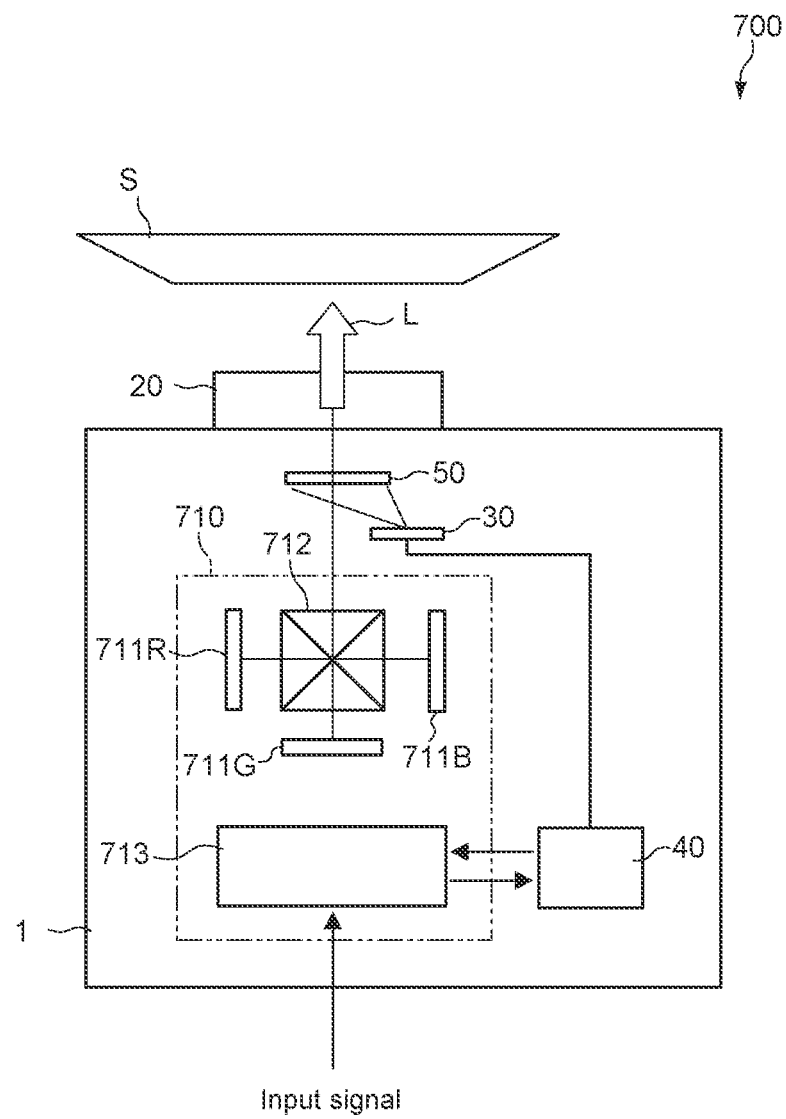
FIG. 8 A schematic configuration diagram of a projection system according to a seventh embodiment of the present technology.

FIG. 8 is a schematic configuration diagram of a projection system 700 according to a seventh embodiment of the present technology. Hereinafter, configurations different from that of the first embodiment will be mainly described, configurations similar to those of the first embodiment will be denoted by similar reference signs, and the descriptions thereof will be omitted or simplified.

The projection system 700 according to this embodiment is different from the first embodiment in the configuration of the image formation apparatus. In this embodiment, an image formation apparatus 710 includes a red spontaneous light-emitting display panel 711R, a green spontaneous light-emitting display panel 711G, a blue spontaneous light-emitting display panel 711B, a combining prism 712, and a driving circuit 713.

The red spontaneous light-emitting display panel 711R, the green spontaneous light-emitting display panel 711G, and the blue spontaneous light-emitting display panel 711B are typically constituted by organic EL display elements and form an image corresponding to an input signal on the basis of the control command from the driving circuit 713. The combining prism 712 combines images of the spontaneous light-emitting display panels 711R, 711G, and 711B of the respective colors and emits image light L toward the projection lens 20.

The measurement assisting apparatus 50 is disposed on the optical axis of the image light L between the combining prism 712 and the projection lens 20. As in the first embodiment, the measurement assisting apparatus 50 is a light-controlling element capable of selectively switching between a light-transmitting mode (first state) to cause the image light L to enter the projection lens 20 and a light-shielding mode (second state) to reflect the image light L toward the measurement apparatus 30.

It should be noted that the present technology is not limited thereto, and the measurement assisting apparatuses 51 to 53 (see FIG. 3 to FIG. 6) described in the third to fifth embodiments may be used as the measurement assisting apparatus.

Also in the projection system 700 according to this embodiment configured in the above-mentioned manner, actions and effects similar to those of the first embodiment can be obtained. Moreover, the blue spontaneous light-emitting display panel 711B of the spontaneous light-emitting display panels of the respective colors has lower light-emitting intensity as compared to the red and green spontaneous light-emitting display panels 711R and 711G, and when the blue spontaneous light-emitting display panel 711B is caused to emit light to match with the red and green light quantity, degradation of the blue spontaneous light-emitting display panel 711B progresses. Such degradation can also be detected on the basis of the output of the measurement apparatus 30.

Eighth Embodiment

Figure 9:
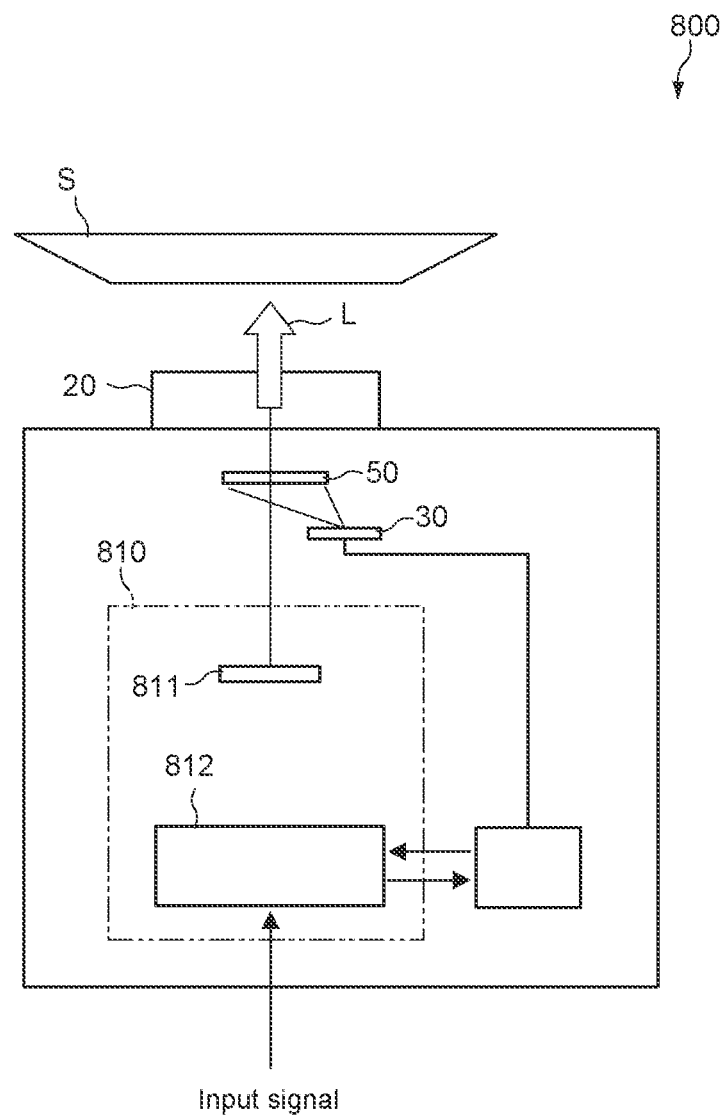
FIG. 9 A schematic configuration diagram of a projection system according to a eighth embodiment of the present technology.

FIG. 9 is a schematic configuration diagram of a projection system 700 according to an eighth embodiment of the present technology. Hereinafter, configurations different from that of the first embodiment will be mainly described, configurations similar to those of the first embodiment will be denoted by similar reference signs, and the descriptions thereof will be omitted or simplified.

The projection system 800 according to this embodiment is different from the first embodiment in the configuration of the image formation apparatus. In this embodiment, an image formation apparatus 810 includes a spontaneous light-emitting display panel 811 and a driving circuit 812.

The spontaneous light-emitting display panel 811 is typically constituted by an organic EL display element of full color. The spontaneous light-emitting display panel 811 forms an image corresponding to an input signal on the basis of a control command from the driving circuit 813 and emits image light L toward the projection lens 20.

The measurement assisting apparatus 50 is disposed on the optical axis of the image light L between the spontaneous light-emitting display panel 811 and the projection lens 20. As in the first embodiment, the measurement assisting apparatus 50 is a light-controlling element capable of selectively switching between a light-transmitting mode (first state) to cause the image light L to enter the projection lens 20 and a light-shielding mode (second state) to reflect the image light L toward the measurement apparatus 30.

It should be noted that the present technology is not limited thereto, and the measurement assisting apparatuses 51 to 53 (see FIG. 3 to FIG. 6) described in the third to fifth embodiments may be used as the measurement assisting apparatus.

Also in the projection system 800 according to this embodiment configured in the above-mentioned manner, actions and effects similar to those of the first embodiment can be obtained. In particular, in accordance with the projection system 800 according to this embodiment, downsizing and thinning of the image formation apparatus can be achieved, and therefore can be configured as a direct viewing-type image display apparatus such a view finder and a head-mounted display.

Other Embodiments

In each of the above-mentioned embodiments, the position of the measurement apparatus 30 that measures the image light L is not particularly limited as long as it is a position that does not block projection of the image light L. For example, in the projection system 100 according to the first embodiment shown in FIG. 1, the measurement apparatus 30 is disposed on the right side in the figure with respect to the optical axis of the image light L, though the measurement apparatus 30 may be disposed on the opposite side (in the figure, the left side).

Figure 10A:
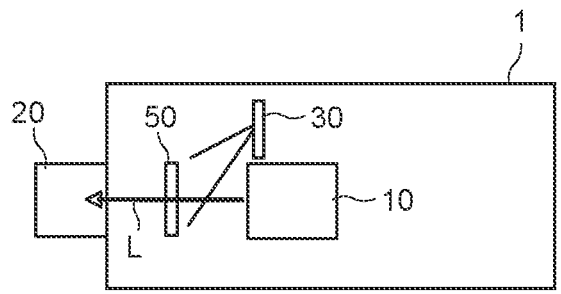
FIGS. 10A, 10B, and 10C A schematic diagram showing a modified example of a configuration of the projection system according to the first embodiment.
Figure 10B:
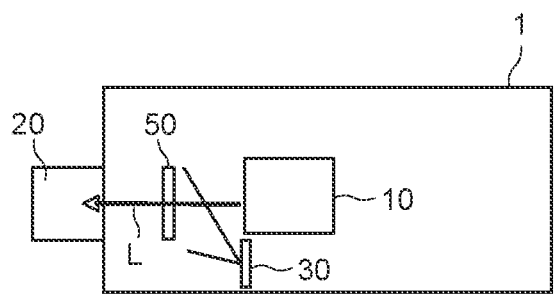

Moreover, as shown in FIGS. 10(A) and 10B, the measurement apparatus 30 may be disposed on the upper or lower side in the figure with respect to the optical axis of the image light L.

Figure 10C:
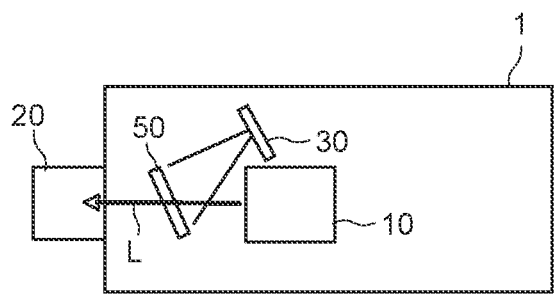
Figure 11:
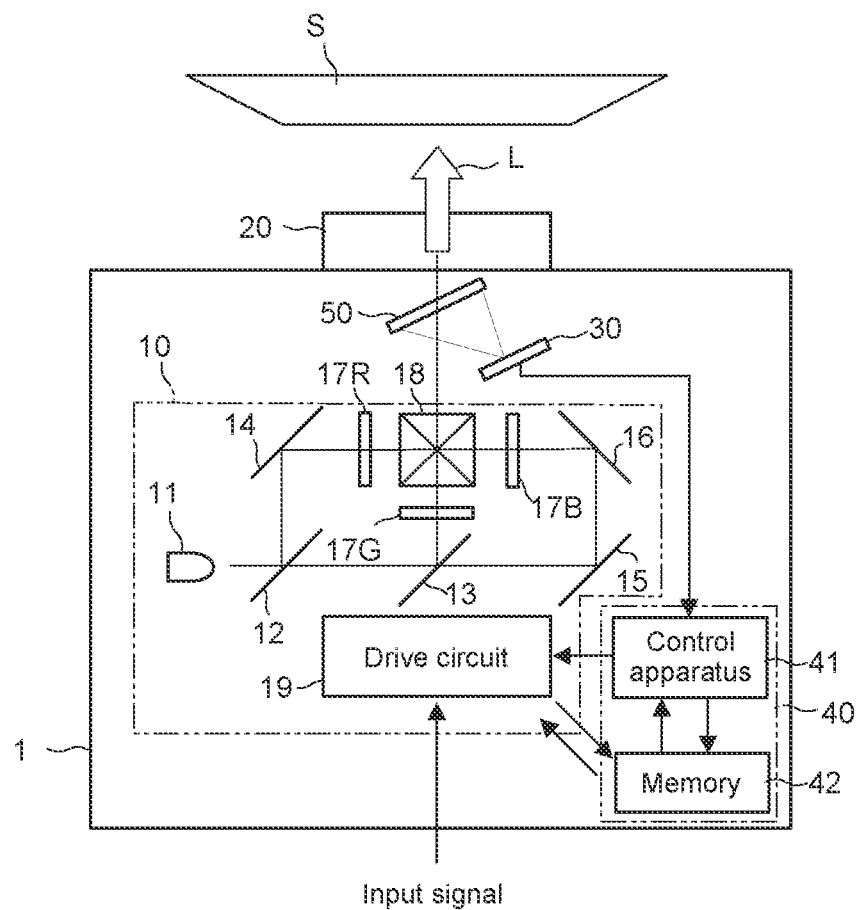
FIG. 11 A schematic diagram showing another modified example of a configuration of the projection system according to the first embodiment.

Moreover, as shown in FIGS. 10C and 11, the measurement assisting apparatus 50 may be disposed, inclined at a predetermined angle in a predetermined direction with respect to the optical axis of the image light L. In this case, the measurement apparatus 30 may also be disposed, inclined at an appropriate angle so as to be capable of receiving the image light L reflected from the measurement assisting apparatus 50.

Figure 12:
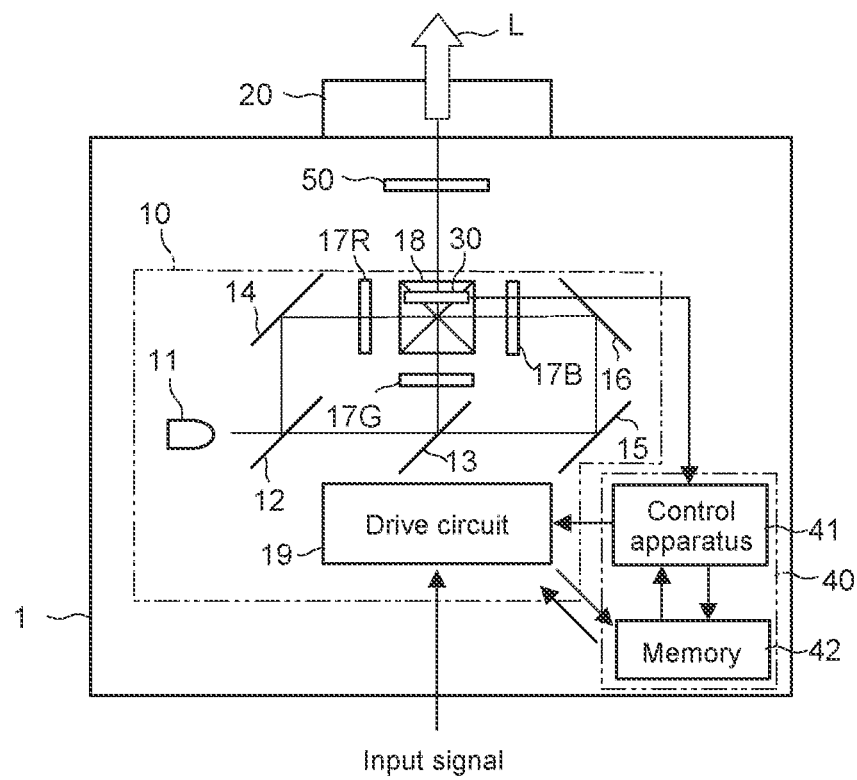
FIG. 12 A schematic diagram showing still another modified example of a configuration of the projection system according to the first embodiment.

In addition, as shown in FIG. 12, the measurement apparatus 30 may be installed in vicinity of the image formation apparatus 10 (combining prism 18 in the shown example) or integrally with it. In this case, there is a possibility that defects in which the measurement apparatus 30 shields the image light L and blocks projection or is subjected to heat generated by the image formation apparatus 10 may occur. In order to avoid such a problem, the measurement apparatus 30 needs to be disposed at a position avoiding the optical axis of the image light.

Figure 13:
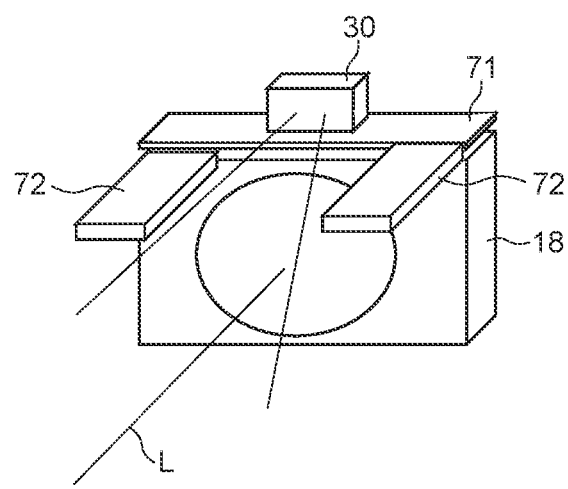
FIG. 13 A schematic configuration diagram showing an installation example of a measurement apparatus in the projection system according to the first embodiment.

On the other hand, as a measure against heat, a heat dissipation plate 71 can be interposed on the measurement apparatus 30 and the optical system (e.g., the combining prism 18) as shown in FIG. 13. The heat dissipation plate 71 may be replaced by a thermal insulation plate. In addition, a light shielding plate 72 may be installed at an appropriate position around the measurement apparatus 30 so as not to receive light other than the image light reflected from the measurement assisting apparatus.

It should be noted that in the projection system (e.g., see FIG. 8) in which the image display elements are constituted by the spontaneous light-emitting display panels, the heat generation amount of the optical system is relatively low, and therefore installation of the measurement apparatus 30 can be easily performed in the combining prism 712 (see FIG. 8) and the like.

It should be noted that the present technology may also take the following configurations.

(1) A projection system, including:
an image formation apparatus that forms image light;
a projection lens that projects the image light;
a measurement apparatus that measures the image light;
a control apparatus that controls the image formation apparatus on the basis of output of the measurement apparatus; and
a measurement assisting apparatus that is disposed between the image formation apparatus and the projection lens and is configured to be capable of selectively switching between a first state to cause the image light to enter the projection lens and a second state to cause the image light to enter the measurement apparatus.

(2) The projection system according to (1), in which the measurement assisting apparatus has a light-reflecting element that reflects, in the second state, the image light toward the measurement apparatus.

(3) The projection system according to (2), in which the light-reflecting element is a light-controlling element capable of switching between a light-transmitting mode and a light-shielding mode.

(4) The projection system according to (2) or (3), in which the light-reflecting element is configured to be capable of movement or rotation between a first position that is a position spaced apart from an optical axis of the image formation apparatus and a second position that is a position on the optical axis.

(5) The projection system according to (4), in which the light-reflecting element is configured to be capable of switching between a first attitude to reflect the image light toward the projection lens and a second attitude to reflect the image light toward the measurement apparatus.

(6) The projection system according to any one of (1) to (5), in which the measurement apparatus includes an imaging element.

(7) The projection system according to (6), in which the imaging element is disposed in the image formation apparatus.

(8) The projection system according to any one of (1) to (7), further including
an imaging apparatus that captures a image projected by the projection lens, in which
the control apparatus controls the image formation apparatus on the basis of the output of the measurement apparatus and output of the imaging apparatus.

(9) The projection system according to any one of (1) to (8), in which the control apparatus has an evaluation unit that evaluates the image light on the basis of the output of the measurement apparatus.

(10) The projection system according to any one of (1) to (9), in which the image formation apparatus includes a three-panel image display element.

(11) The projection system according to any one of (1) to (9), in which the image formation apparatus includes a single-panel image display element.

(12) The projection system according to (10) or (11), in which the image display element is a spontaneous light-emitting-type display element.

(13) A control method for a projection system, including:
forming image light through an image formation apparatus;
causing the image light to enter a projection lens when projecting the image light; and
disposing a light-reflecting element between the image formation apparatus and the projection lens and causing the image light reflected on the light-reflecting element to enter a measurement apparatus when evaluating the image light.

REFERENCE SIGNS LIST 1 casing
10, 610, 710, 810 image formation apparatus
20 projection lens
30 measurement apparatus
41 control apparatus
50, 51, 52, 53 measurement assisting apparatus
60 imaging apparatus
100, 200, 300, 400, 500, 600, 700, 800 projection system
L image light
S screen

The invention claimed is:

1. A projection system, comprising:
an image formation apparatus configured to form image light;
a projection lens configured to project the image light on a screen;
a measurement apparatus configured to measure the image light;
a control apparatus configured to control the image formation apparatus based on an output of the measurement apparatus and perform calibration of the image light; and
a measurement assisting apparatus configured to switch between a first state and a second state, wherein
the measurement assisting apparatus is between the image formation apparatus and the projection lens,
the switch of the measurement assisting apparatus to the first state is based on projection of the image light onto the screen,
the switch of the measurement assisting apparatus to the second state is based on the calibration of the image light,
the first state corresponds to entrance of the image light in the projection lens, and
the second state corresponds to the entrance of the image light in the measurement apparatus.

2. The projection system according to claim 1, wherein the measurement assisting apparatus has a light-reflecting element that is configured to reflect, in the second state, the image light toward the measurement apparatus.

3. The projection system according to claim 2, wherein the light-reflecting element is a light-controlling element configured to switch between a light-transmitting mode and a light-shielding mode.

4. The projection system according to claim 2, wherein the light-reflecting element is configured to move or rotate between a first position that is a position spaced apart from an optical axis of the image formation apparatus and a second position that is a position on the optical axis.

5. The projection system according to claim 4, wherein the light-reflecting element is further configured to switch between a first attitude to reflect the image light toward the projection lens and a second attitude to reflect the image light toward the measurement apparatus.

6. The projection system according to claim 1, wherein the measurement apparatus includes an imaging element.

7. The projection system according to claim 6, wherein the imaging element is in the image formation apparatus.

8. The projection system according to claim 1, further comprising an imaging apparatus a configured to capture the image light projected by the projection lens, wherein
the control apparatus is further configured to control the image formation apparatus based on the output of the measurement apparatus and an output of the imaging apparatus.

9. The projection system according to claim 1, wherein the control apparatus comprises an evaluation unit that is configured to evaluate the image light based on the output of the measurement apparatus.

10. The projection system according to claim 1, wherein the image formation apparatus includes a three-panel image display element.

11. The projection system according to claim 1, wherein the image formation apparatus includes a single-panel image display element.

12. The projection system according to claim 10, wherein the three-panel image display element is a spontaneous light-emitting-type display element.

13. A control method for a projection system, comprising:
forming image light through an image formation apparatus;
causing the image light to enter a projection lens during projection of the image light;
measuring, by a measurement apparatus, the image light;
controlling, by a control apparatus, an output of the measurement apparatus;
performing, by the control apparatus, calibration processing of the image light;
disposing a light-reflecting element between the image formation apparatus and the projection lens; and
switching, by a measurement assisting apparatus, between a first state and a second state, wherein
the switch of the measurement assisting apparatus to the first state is based on projection of the image light onto a screen,
the switch of the measurement assisting apparatus to the second state is based on the performance of the calibration processing of the image light,
the first state corresponds to entrance of the image light in the projection lens, and
the second state corresponds to the entrance of the image light in the measurement apparatus.

* * * * *